United States Patent
Stancu et al.

(10) Patent No.: US 9,296,292 B2
(45) Date of Patent: Mar. 29, 2016

(54) CAPLESS FUEL SYSTEM

(71) Applicant: Martinrea Industries, Inc., Troy, MI (US)

(72) Inventors: Sorin Stancu, Dearborn, MI (US); James J. Kerin, Jr., Grosse Pointe Woods, MI (US); Jerry Walter Fearn, Mayville, MI (US)

(73) Assignee: Martinrea Industries, Inc., Troy, MI (US)

( * ) Notice: Subject to any disclaimer, the term of this patent is extended or adjusted under 35 U.S.C. 154(b) by 0 days.

(21) Appl. No.: 14/561,779

(22) Filed: Dec. 5, 2014

(65) Prior Publication Data

US 2015/0158379 A1 Jun. 11, 2015

Related U.S. Application Data

(60) Provisional application No. 61/913,422, filed on Dec. 9, 2013.

(51) Int. Cl.
*B60K 15/04* (2006.01)
*B60K 15/05* (2006.01)

(52) U.S. Cl.
CPC ......... *B60K 15/04* (2013.01); *B60K 2015/0429* (2013.01); *B60K 2015/0461* (2013.01); *B60K 2015/0483* (2013.01)

(58) Field of Classification Search
CPC .................. B60K 2015/04; B60K 2015/0429; B60K 2015/0461; B60K 2015/0483; B60K 15/04
USPC ................................................ 220/86.2, 86.3
See application file for complete search history.

(56) References Cited

U.S. PATENT DOCUMENTS

| | | | |
|---|---|---|---|
| 3,730,216 A * | 5/1973 | Arnett ..................... | B60K 15/04 137/588 |
| 6,155,316 A | 12/2000 | Benjey | |
| 6,968,874 B1 | 11/2005 | Gabbey et al. | |
| 6,983,773 B1 * | 1/2006 | Hagano .................. | B60K 15/04 141/348 |
| 7,318,462 B2 * | 1/2008 | Ganachaud ............ | B60K 15/04 141/301 |
| 7,665,493 B2 | 2/2010 | Groom et al. | |
| 2006/0032552 A1 * | 2/2006 | Hedevang .............. | B60K 15/04 141/367 |
| 2007/0034287 A1 * | 2/2007 | Groom ................... | B60K 15/04 141/350 |
| 2009/0001077 A1 * | 1/2009 | Feichtinger ............ | B60K 15/04 220/86.2 |
| 2009/0194198 A1 * | 8/2009 | Bar ........................ | B60K 15/04 141/349 |
| 2011/0132906 A1 | 6/2011 | Miller et al. | |
| 2012/0211489 A1 | 8/2012 | Walser et al. | |
| 2013/0075395 A1 * | 3/2013 | Hagano ............... | B60K 15/0406 220/86.2 |
| 2013/0211489 A1 * | 8/2013 | Makower ................ | A61F 2/915 623/1.2 |
| 2013/0213963 A1 * | 8/2013 | Chretien .................. | B67D 7/06 220/86.2 |
| 2013/0228576 A1 * | 9/2013 | Gerdes ............... | B60K 15/0406 220/86.2 |

* cited by examiner

*Primary Examiner* — J. Gregory Pickett
*Assistant Examiner* — Niki M Eloshway
(74) *Attorney, Agent, or Firm* — Dinsmore & Shohl LLP (57) ABSTRACT

A capless fuel system having an elongated tubular and cylindrical housing open at each end and in which the housing defines a first and a second longitudinally spaced fluid ports. A first flapper valve is associated with the first fluid port and a second flapper valve is associated with the second fluid port. A pair of diametrically opposed latches pivotally mounted to the housing adjacent the second fluid port retain the second flapper valve in a closed position until a fuel nozzle of a predetermined size is inserted towards the second port. The fuel nozzle engages camless surfaces which pivot the latches away from the second flapper valve allowing the fuel filling nozzle to pass through the second port.

20 Claims, 7 Drawing Sheets

Fig-8

CAPLESS FUEL SYSTEM

CROSS-REFERENCE TO RELATED APPLICATIONS

This application claims priority of U.S. Provisional Application 61/913,422 filed Dec. 9, 2013, the contents of which are incorporated herein by reference.

BACKGROUND OF THE INVENTION

I. Field of the Invention

The present invention relates to fuel systems for automotive vehicles and, more particularly, to a capless fuel system for an automotive vehicle.

II. Description of Related Art

Automotive vehicles which utilize internal combustion engines necessarily require a fuel filling system. For many decades, the fuel filling system included a filler pipe connected to a fuel tank. The upper or inlet end of the fill tube was conventionally formed to accept a fuel cap which was removed only during fuel filling. A primary disadvantage of the system, however, is that the fuel caps not only became lost, but also added an additional cost to the automotive vehicle.

Consequently, capless fuel systems have been developed for automotive vehicles which eliminate the necessity of the fuel cap for closing the fuel fill tube. These previously known capless systems included a body which is generally cylindrical in shape and having an inlet end and an outlet end. The outlet end was connected to a fill tube which in turn was fluidly connected to the fuel tank. Conversely, the inlet end of the housing was dimensioned to receive a fuel nozzle for dispensing fuel through the housing, fill tube, and into the fuel tank. In order to prevent fuel fumes from escaping from the fuel tank, through the housing, and into the atmosphere, these previously known capless systems included a flapper valve which is fluidly connected in series between the inlet and the outlet of the housing. A spring urges the flapper valve against a valve seat contained within the housing in order to prevent the escape of fuel fumes into the atmosphere during the normal operation of the automotive vehicle. However, during a fuel filling operation, the fuel nozzle is inserted into the housing inlet and mechanically opens the flapper valve to permit fluid communication of the fuel from the fuel nozzle through the filler tube and into the fuel tank.

In certain situations, such as very hot weather, fuel fumes within the fuel tank may create an unacceptable high pressure of fuel fumes within the tank. Consequently, these previously known capless systems necessarily included a pressure relief valve formed in the housing. These pressure relief valves would open when the pressure within the fuel tank exceeded a predetermined pressure. Upon opening, the pressure relief valves would vent the fuel fumes.

The overall housing for the previously known fuel filling systems necessarily must be large enough to accommodate a flapper valve having a size sufficient to permit a standard fuel filling nozzle from a fuel pump to not only mechanically open the flapper valve, but also to extend through the port associated with the flapper valve. These fuel relief valves were then also contained within the housing at a position spaced radially outwardly from the flapper valve. While the system worked adequately to vent excess pressure from the fuel tank to the atmosphere, the positioning of the previously known pressure relief valves necessarily increased the overall size of the housing for the fuel filling system. This in turn increased not only the material cost for the fuel filling system, but also the space requirements in the vehicle for the fuel filling system.

A still further disadvantage of the previously known capless systems is that the flapper valve contained within the housing of the capless system would occasionally get stuck in between the insert provided around a standard fuel filling nozzle and the nozzle itself. When this occurred, the fuel filling nozzle could become "stuck" within the housing of the fuel filling system. When this occurred, the vehicle would be temporarily attached to the fuel pump.

A still further disadvantage of the previously known fuel filling systems, including capless systems, is that air is necessarily entrained within the fuel flow from the nozzle and into the fuel fill pipe. This entrained air, in turn, creates fuel fumes and these fuel fumes are then entrapped within carbon canisters contained within the fuel system of the vehicle. During the operation of the internal combustion engine, the fuel fumes from the carbon canisters are returned to the fuel system for combustion in the engine.

The standard carbon canisters used with fuel systems work adequately with automotive vehicles that are powered by internal combustion engines. However, hybrid vehicles utilize operation of an internal combustion engine only a short time during the overall operation of the automotive vehicle. The rather short time of operation of the internal combustion engine of a hybrid vehicle has proven insufficient to adequately return the fuel fumes stored in the fuel refill system carbon canisters to the fuel system for combustion.

A still further disadvantage of the previously known fuel filling system resides in the possibility of incorrectly filling a fuel tank of an automotive vehicle having a gasoline powered internal combustion engine with diesel fuel. The standard fuel filling nozzle for diesel fuel is smaller in diameter than the standard fuel filling nozzle for gasoline. Consequently, it has been possible to simply insert the diesel fuel filling nozzle into the fuel filling system and fill the fuel tank with diesel fuel. Subsequent operation of the internal combustion engine, however, will result in significant damage or even destruction of the internal combustion engine.

SUMMARY OF THE PRESENT INVENTION

The present invention provides a capless fuel filling system which overcomes all of the above-mentioned disadvantages of the previously known fuel filling systems.

In brief, the capless fuel filling system of the present invention includes an elongated tubular and cylindrical housing open at each end. Preferably, the cylindrical housing is constructed from a plastic material for inexpensive yet durable construction.

A first and second axially spaced fluid port are formed within the housing with the first fluid port positioned adjacent the inlet of the housing and the second fluid port positioned adjacent the outlet for the housing. These fluid ports are substantially axially aligned with each other and are dimensioned to receive a standard fuel filling nozzle therethrough.

A first flapper valve is associated with the first fuel port and is movable between an open and a closed position. A spring urges the first flapper valve towards a closed position. Similarly, a second flapper valve is associated with the second fluid port and is also movable between an open and a closed position. A spring also urges the second flapper valve towards its closed position.

Both flapper valves move away from the housing inlet and towards the housing outlet when moving from a closed and to an open position. Consequently, a fuel filling nozzle inserted into the inlet end of the housing passes through both the first and second fluid ports in the housing and, in doing so, pivots the first and second flapper valves from an open and to a closed position.

In order to prevent an unacceptable pressure buildup within the fuel tank, the fuel filling system of the present invention includes a first and second pressure relief valve. Unlike the previously known fuel filling systems, the first pressure relief valve is contained within the interior of the first flapper valve and, similarly, the second pressure relief valve is contained within the interior of the second flapper valve.

In order to prevent the insertion of a smaller diameter diesel fuel filling nozzle into a fuel filling system designed for a gasoline fueled engine, a pair of diametrically opposed latches are provided in the housing adjacent the second flapper valve. These latches are pivotal between a latched and an unlatched position and are urged towards their latched position by a spring.

The latches engage the second flapper valve when in their latched position and prevent opening of the second flapper valve. Consequently, when the incorrect fuel filling nozzle is inserted against the second flapper valve, the latches hold the second flapper valve in a closed position and prevent fuel from the fuel filling nozzle to enter into the fuel tank.

Conversely, a cam surface is formed on each latch and this cam surface is positioned within the housing but spaced towards the housing inlet from the second port. When a properly sized fuel filling nozzle is inserted into the housing, the fuel nozzle engages both cam surfaces of both latches and pivots both latches to their unlatched position. This, in turn, releases the second flapper valve to move from its closed and to its open position.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION OF A PREFERRED EMBODIMENT OF THE PRESENT INVENTION

Figure 1:
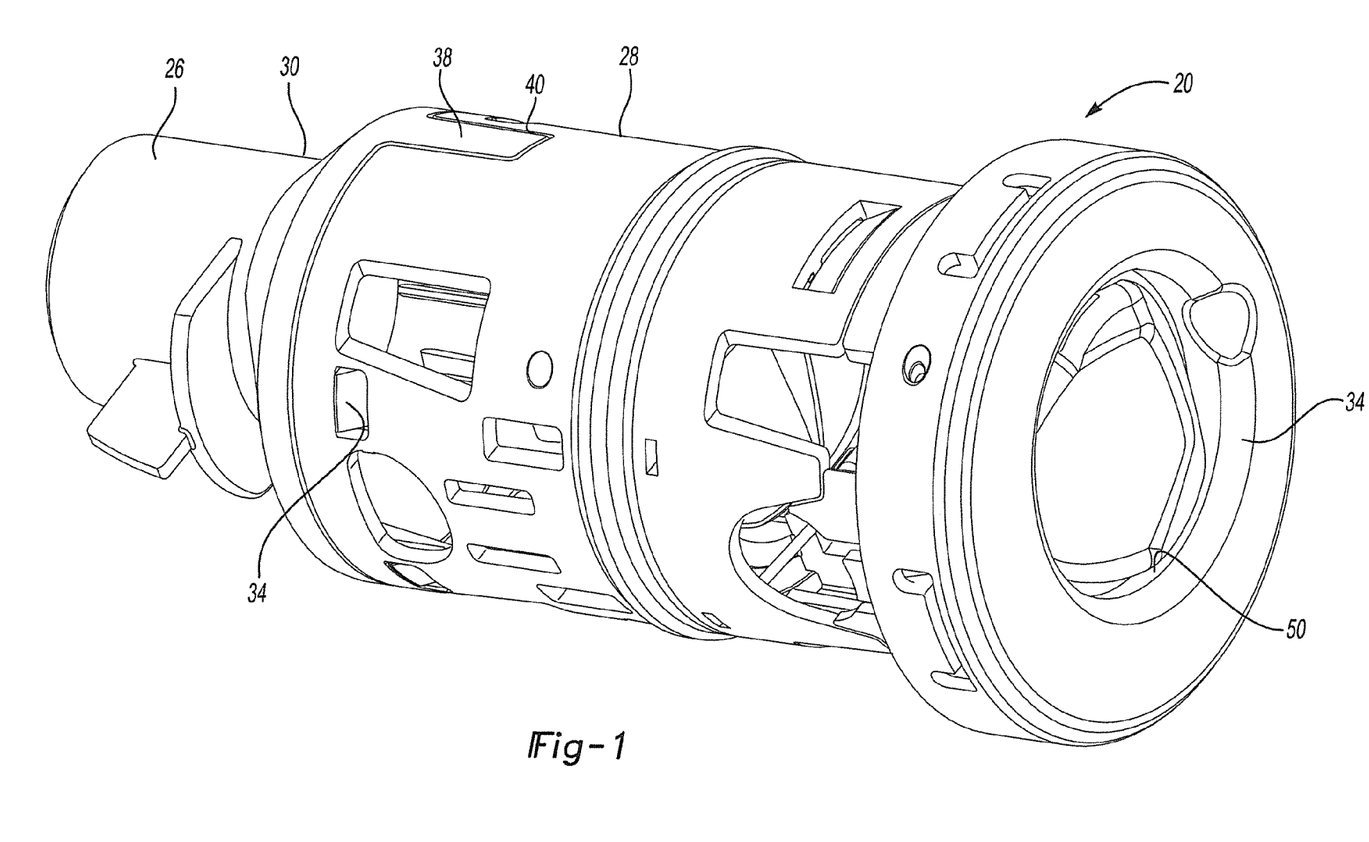
FIG. 1 is an elevational view illustrating a preferred embodiment of the present invention.
Figure 5:
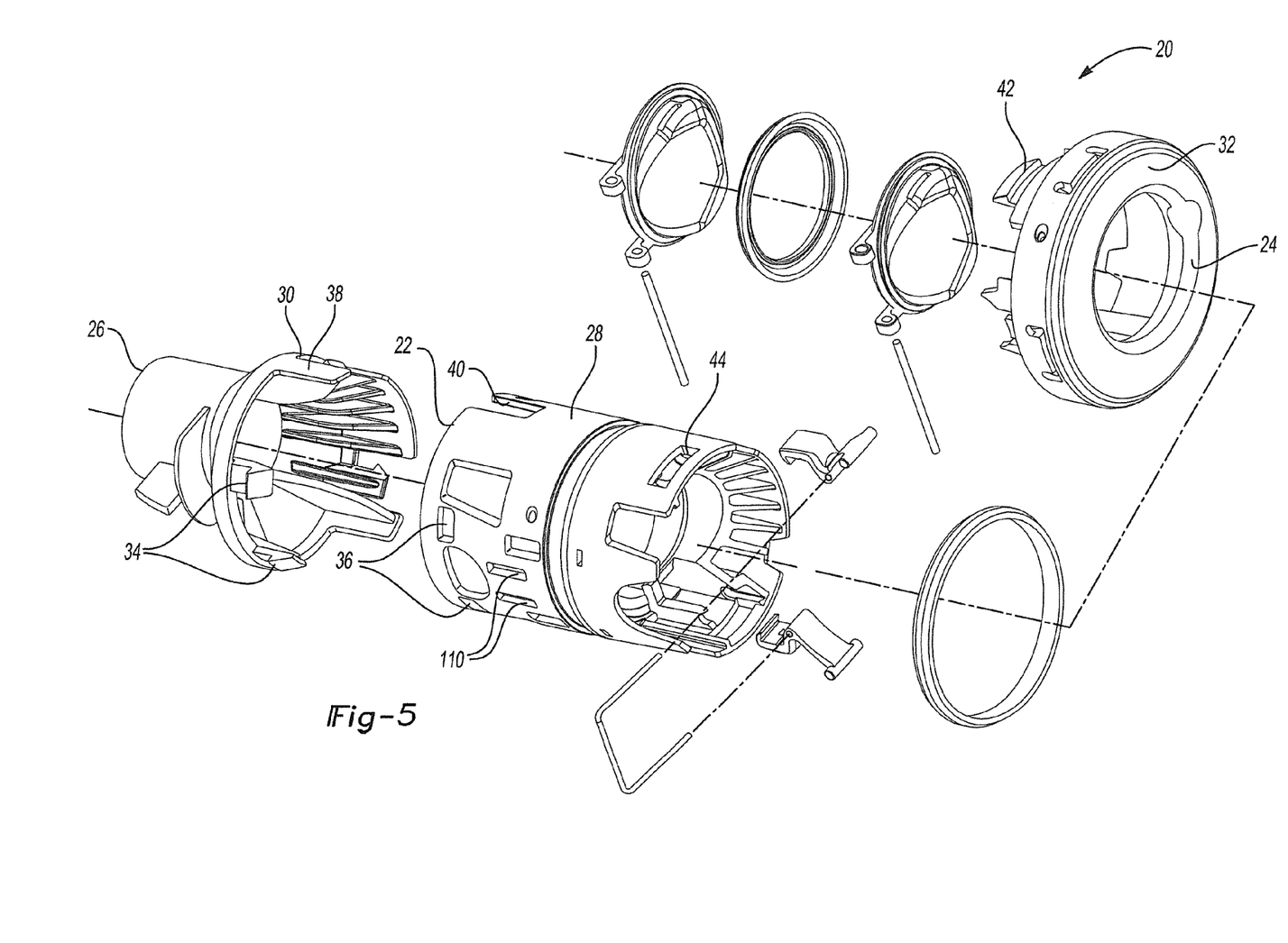
FIG. 5 is an exploded view of the fuel delivery system.

With reference first to FIGS. 1 and 5, a capless fuel filling system 20 is shown having an elongated tubular and cylindrical body 22. The body 22 is open at both an inlet end 24 and an outlet end 26.

The body 22 is preferably made of a rigid but flexible material, such as plastic. Furthermore, as best shown in FIG. 5, the body preferably includes a central section 28, outlet funnel section 30, and an annular cap 32 attached to the inlet end of the central body section 28. Although any means may be used to secure the central section 28, funnel section 30, and cap 32 together, preferably the central section 28 and funnel 30 are snap fitted together by flexible tabs 34 on the funnel section 30 which engage openings 36 in the central section 28 as the funnel section 30 and central section 28 are axially slid together. Furthermore, a guidance tab 38 on the funnel section 30 is aligned with a guide slot 40 on the central section 28 as the central section 28 and funnel section 30 are assembled together to facilitate the proper alignment of the central section 28 and funnel section 30.

Similarly, the cap 32 includes tabs 42 which engage openings 44 in the central section 28 as the cap 32 and central section 28 are axially slid together. During such assembly, the snap tabs 42 flex radially inwardly during assembly until the tabs 42 are aligned with the openings 44 whereupon the tabs 42 flex radially outwardly to lock the cap 32 and central section 28 together.

Figure 3:
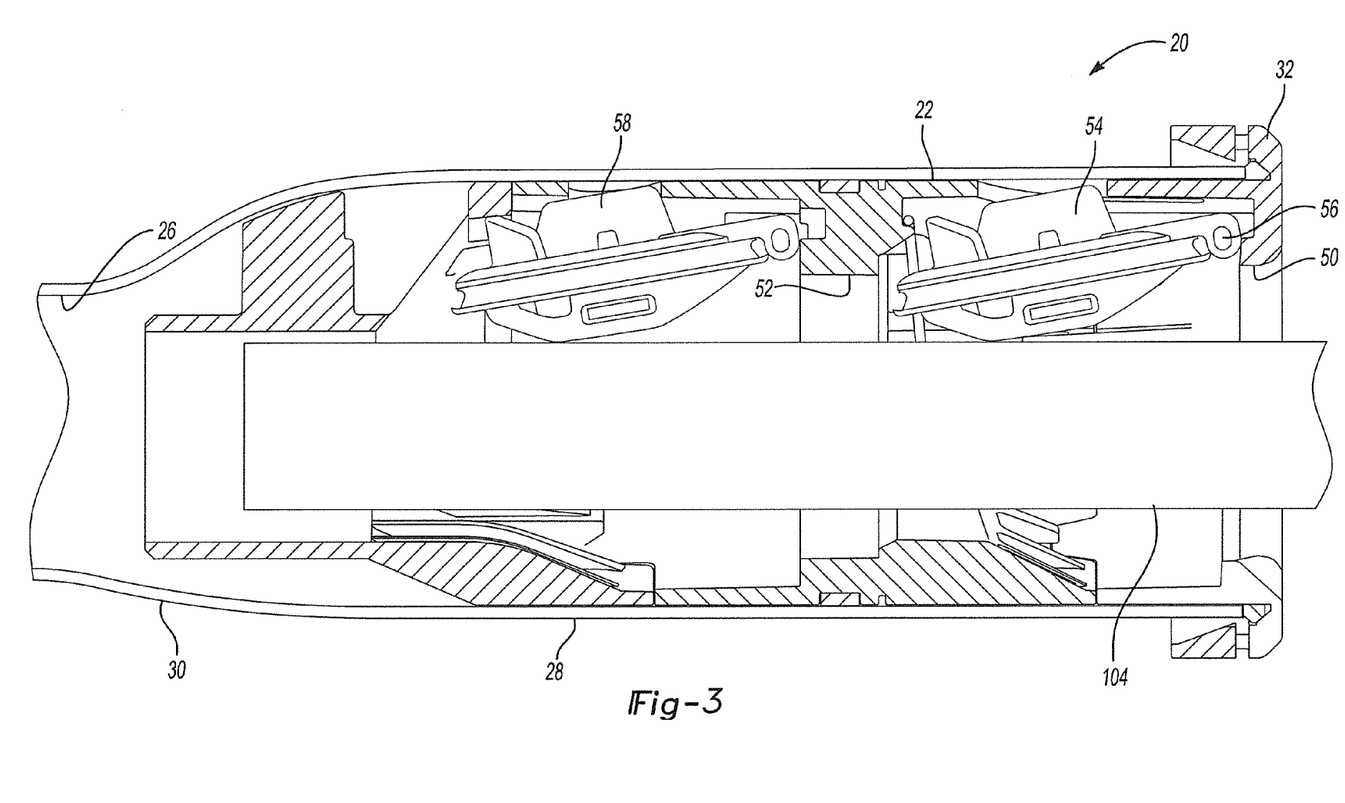
FIG. 3 is a view similar to FIG. 2 but illustrating the flapper valves in an open position during a refilling operation.

With reference now particularly to FIG. 3, the cap 32 forms a first circular fluid port 50 in the capless fuel system 20. A second circular port 52 is formed at a midpoint in the central section 28 of the body 22. These ports 50 and 52, furthermore, are axially aligned with each other as well as aligned with an outlet 26 from capless system 20.

Figure 2:
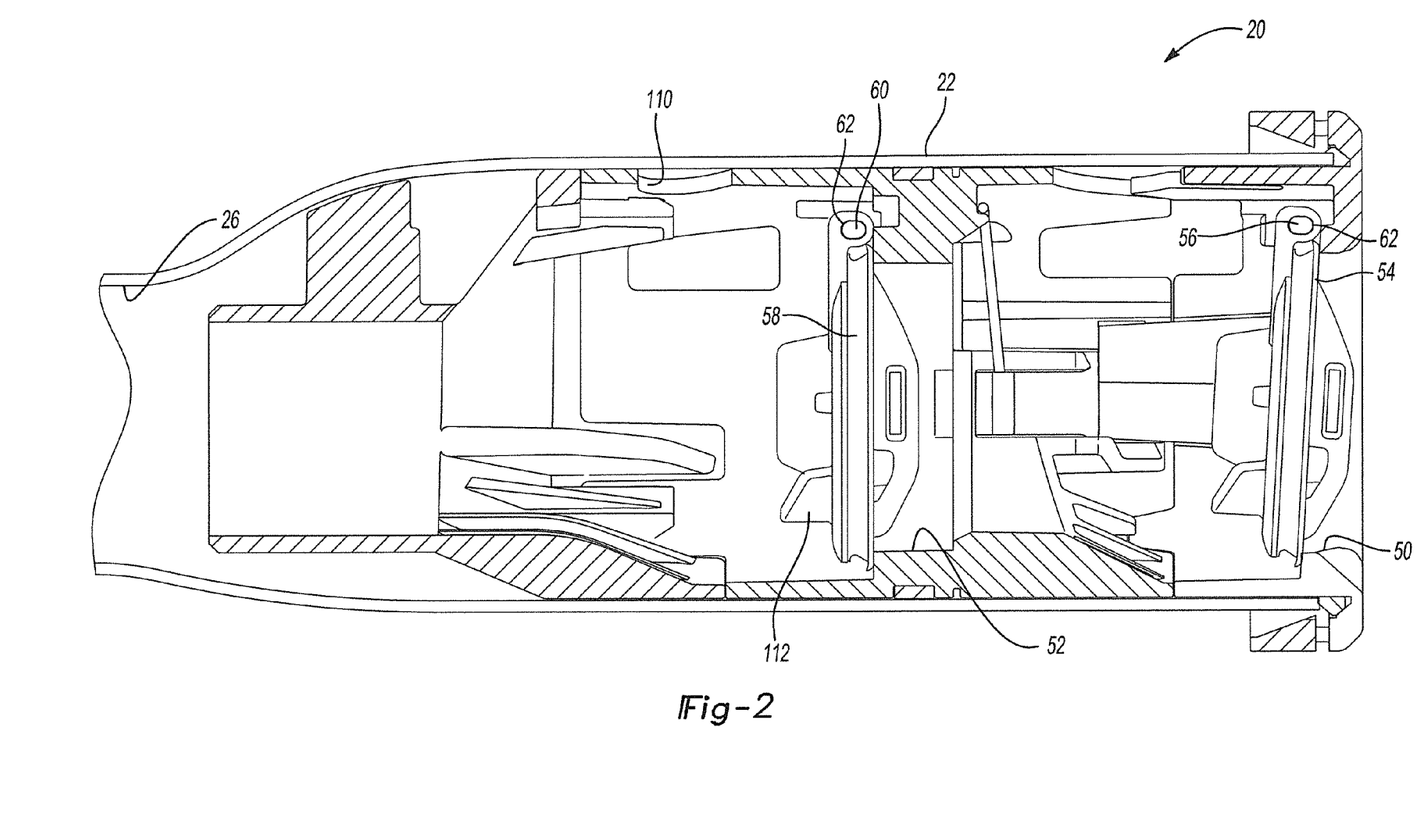
FIG. 2 is a longitudinal sectional view thereof and with the flapper valves in a closed position.

With reference now to FIGS. 2 and 3, a first flapper valve 54 is associated with the first fluid port 50 and is pivotally mounted to the housing 22 by a pivot pin 56. The first flapper valve 54 is thus movable between a closed position, illustrated in FIG. 2, in which the flapper valve 54 seals the port 50, and an open position, illustrated in FIG. 3.

Similarly, a second flapper valve 58 is associated with the second fluid port 52. The second flapper valve is pivotally mounted to the housing by a pivot pin 60 and is movable between a closed position, illustrated in FIG. 2, in which the second flapper valve 58 closes the fluid port 52, and an open position, illustrated in FIG. 3. Furthermore, any conventional mechanism, such as springs 62, may be used to urge the flapper valves 54 and 58 towards their closed positions.

The first and second flapper valves 54 and 58, respectively, are substantially identical in construction. Therefore, only the second flapper valve 58 will be described in detail, it being understood that a like description shall also apply to the first flapper valve 54.

Figure 4:
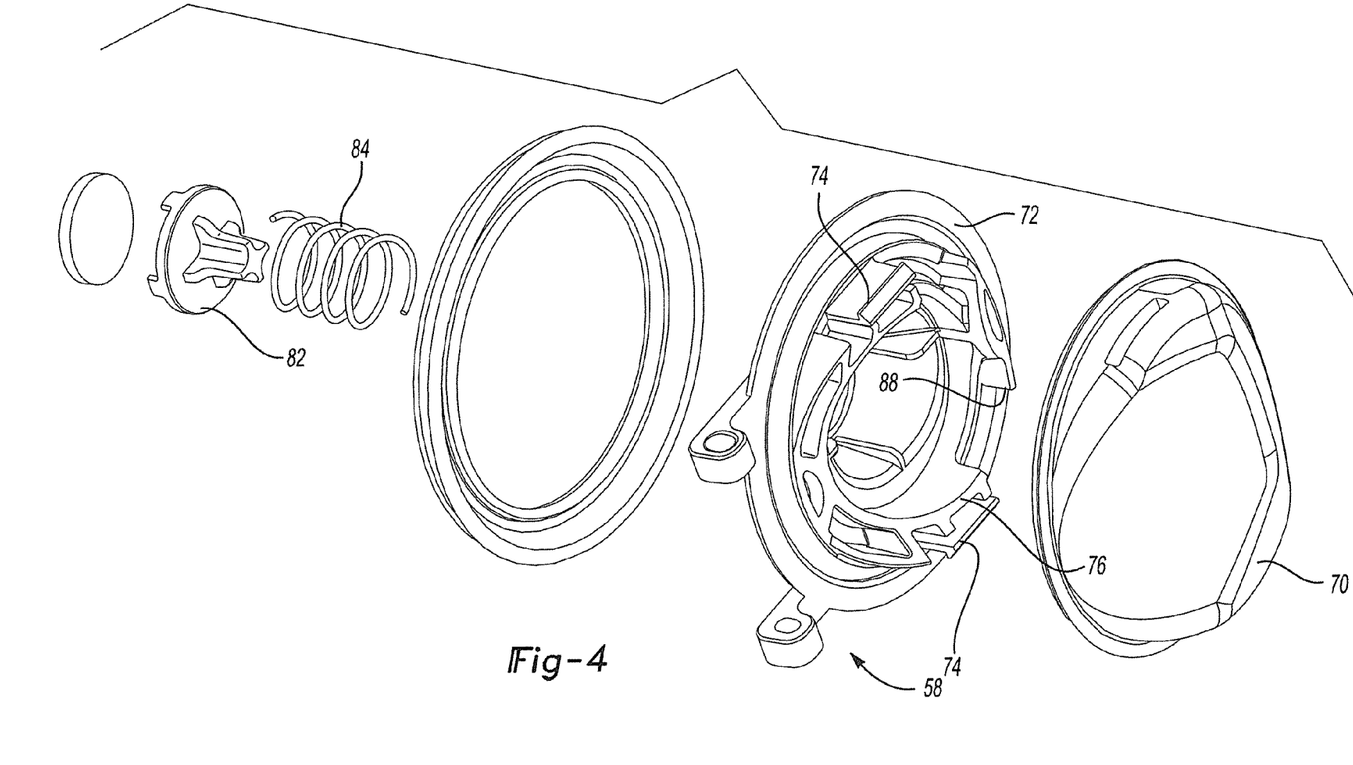
FIG. 4 is an exploded view of one flapper valve with its associated pressure relief valve.
Figure 6:
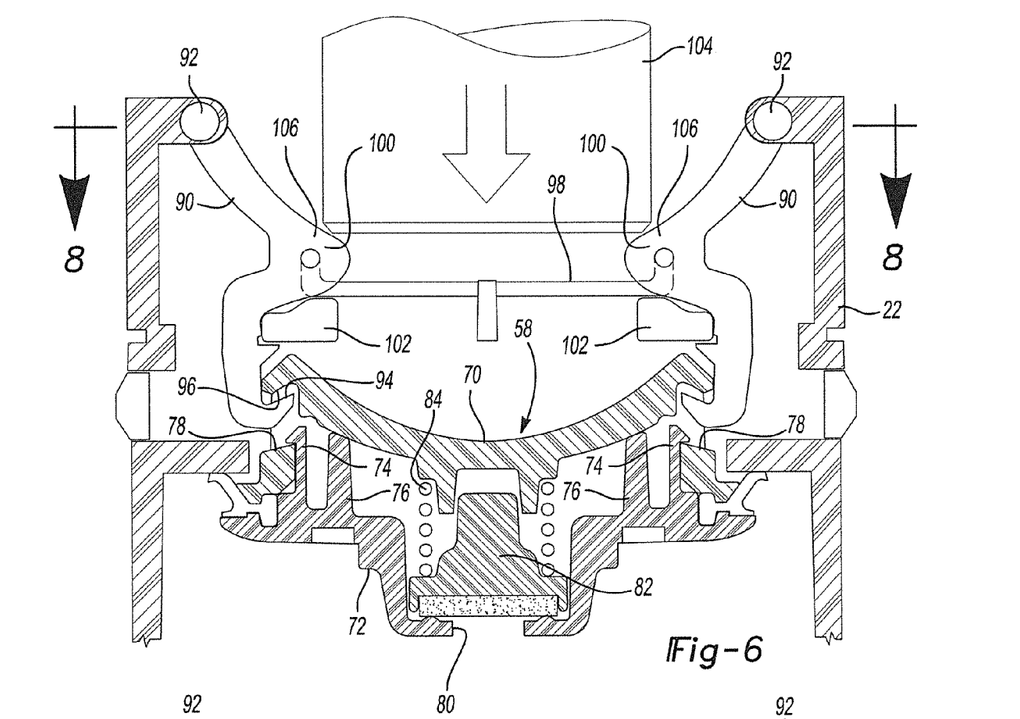
FIG. 6 is a fragmentary longitudinal sectional view of the second flapper valve with the latches in a latched position.
Figure 7:
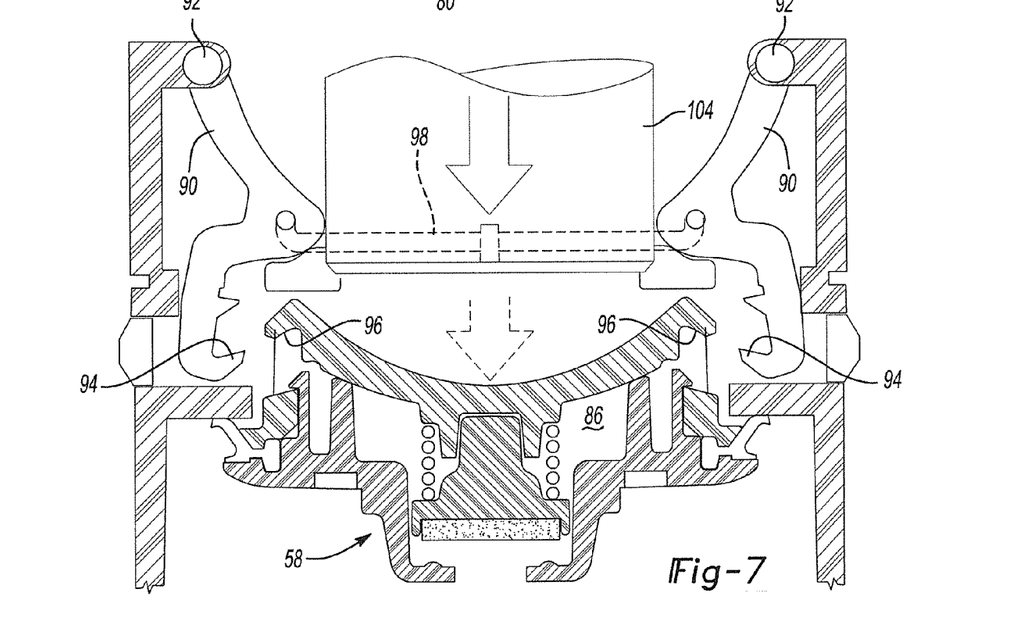
FIG. 7 is a view similar to FIG. 6, but illustrating the latches in an unlatched position.

With reference then to FIGS. 4, 6, and 7, the flapper valve 58 is there shown in greater detail and comprises an upper part 70 and a lower part 72. The parts 70 and 72 are both constructed of a rigid material, such as plastic, and are secured together in any conventional fashion. However, as illustrated, the lower part 72 includes snap tabs 74 which flex radially inwardly as the upper part 70 and lower part 72 are axially compressed together during assembly. When the upper part 70 and lower part 72 are fully compressed together to their assembled position, stops 76 on the lower part 72 abut against the upper part 70 and prevent further axial compression of the upper part 70 and lower part 72 together. Simultaneously, in its fully assembled position, the snap tabs 74 flex outwardly due to their natural resiliency over latching surfaces 78 formed on the first part 70 to lock the upper part 70 and lower part 72 together.

Still referring to FIGS. 4, 6, and 7, a pressure relief port 80 is formed through the lower part 72 of the flapper valve 58. A pressure relief valve 82 is contained between the upper part 70 and lower part 72 of the flapper valve 58. This pressure relief valve 82 is urged towards a closed position by a compression spring 84. However, whenever the pressure within the fuel tank or at the outlet 26 exceeds a predetermined pressure, the pressure relief valve 82 will move against the force of the spring 84 to an open position as shown in FIG. 7 thus allowing the excess pressure to escape through an interior chamber 86 formed between the upper and lower valve parts 70 and 72, respectively, and through openings 88 (FIG. 4) to relieve the fuel tank pressure.

With reference now to FIG. 2, in order to maintain the compact construction for the overall housing 22, the housing 22 preferably includes slots 110 (FIG. 5) which register with reinforcing ribs 112 (FIG. 2) formed on the flapper valve 58 or 54. These slots 110 thus allow the flapper valves 58 and 54 to move to a fully open position in which the reinforcing ribs 112 extend through the slots 110 thus retaining a small overall diameter for the housing 22.

Figure 8:
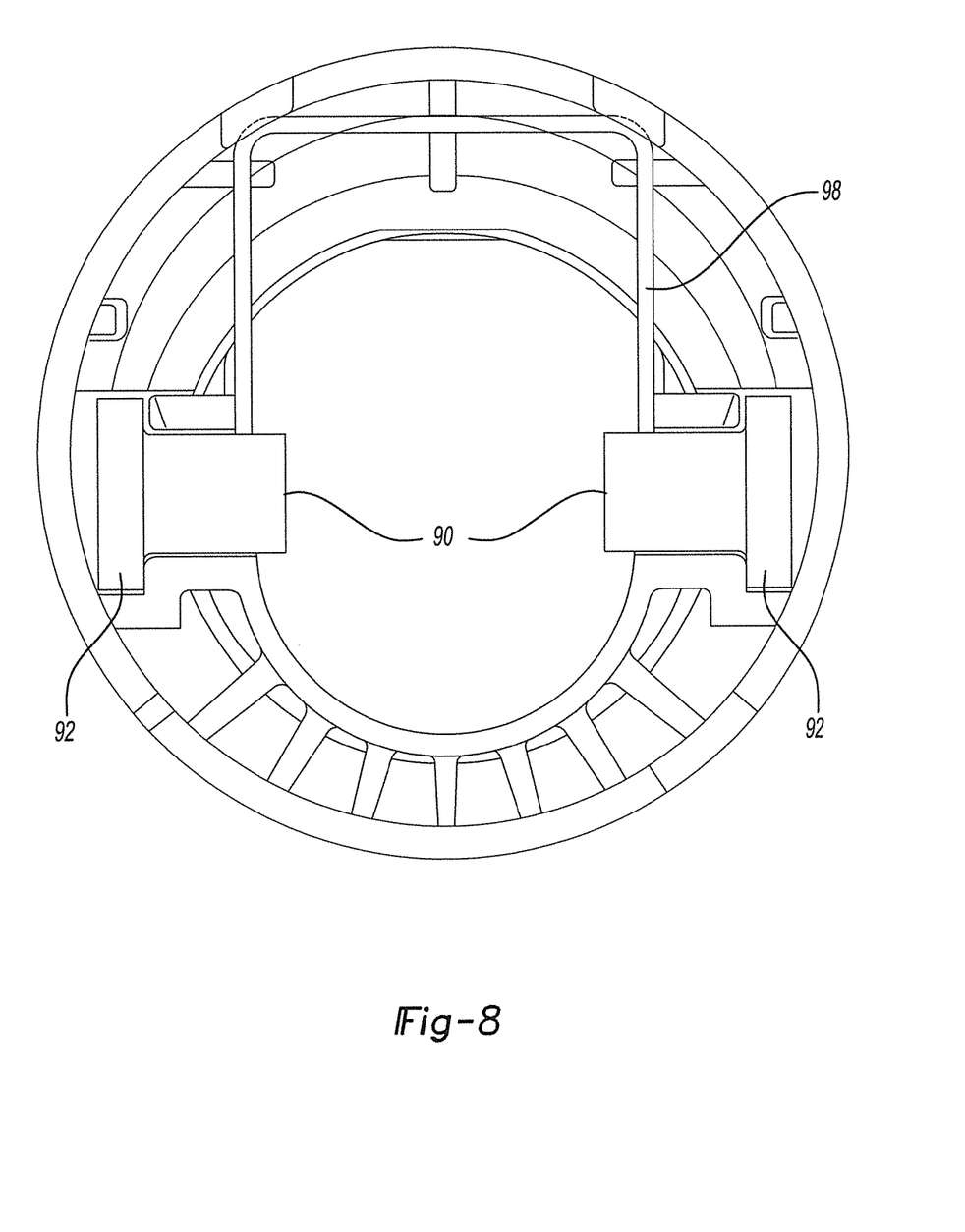
FIG. 8 is a sectional view taken along line 8-8 in FIG. 6.

With reference now to FIGS. 6-8, a pair of latches 90 are associated with the second flapper valve 58, but not the first flapper valve 54. These latches 90 are pivotally mounted to the housing 22 by pivot pins 92 at their upper or outermost end. These latches 90, furthermore, are pivotal between a latched position, illustrated in FIG. 6, and an unlatched position, illustrated in FIG. 7.

In their latched position, a hook 94 at the lower end of each latch 90 engages a latch surface 96 on the second flapper valve 58. Consequently, with the latches 90 in their latched position, the latches 90 prevent the flapper valve 58 from moving to its open position as shown in FIG. 3.

A generally U-shaped spring 98 is pivotally connected to a midpoint 100 of each latch 90. This spring 98 urges the latches 90 radially inwardly until the latches abut against stop members 102 on the housing 22. The stop members 102 thus limit the radially inward travel of the latches 90 to a position in which the latches 90 are positioned in their latched position.

When a proper size fuel filling nozzle 104 is inserted into the housing 22 as shown in FIG. 6, the fuel nozzle 104 engages a cam surface 106 on the latches 90. Upon further insertion of the fuel filling nozzle 104 to the position shown in FIG. 7, the nozzle 104 displaces the latches 90 radially upwardly against the force of the spring 98 thus moving the latch hooks 94 away from the latch surfaces 96 on the second flapper valve 58. In doing so, the flapper valve 58 is free to move to its open position, as shown in FIG. 3, upon further insertion of the fuel filling nozzle 104 into the housing 22.

With reference now to FIG. 3, in operation upon insertion of the fuel filling nozzle 104 into the housing inlet or first fluid port 90, the fuel filling nozzle 104 mechanically opens the first flapper valve 54. Upon further insertion, the fuel nozzle 104, if of the proper size, moves the latches to the unlatched position, as shown in FIG. 7, so that upon further insertion of the fuel filling nozzle 104 into the housing 22, the nozzle 104 opens the second flapper valve 58 to its open position. Thereafter, fueling can commence.

Conversely, if a fuel filling nozzle 104 having a smaller diameter than a gasoline filling nozzle, e.g. a diesel fuel filling nozzle, the nozzle 104 will not contact the cam surfaces 106 of both latches 90 upon insertion into the housing 22 to the position shown in FIG. 6. Rather, the nozzle 104 will only contact, at most, one of the cam surfaces 106 of the latches 90. Consequently, the other latch 90 will remain in a latched position and prevent opening of the second flapper valve 58 by the fuel nozzle 104. As such, the latches 90 prevent refilling of a gasoline fuel tank with diesel fuel.

From the foregoing, it can be seen that the present invention provides a capless fuel filling system which is not only simple, but effective in operation. The capless fuel filling system of the present invention not only prevents the refilling of a gasoline fuel tank by diesel fuel, but also protects the fuel tank against excessive pressures. Furthermore, since the pressure relief valves are contained wholly within the flapper valves, the entire system remains a compact system.

Having described my invention, however, many modifications thereto will become apparent to those skilled in the art to which it pertains without deviation from the spirit of the invention as defined by the scope of the appended claims.

We claim:

1. A capless fuel apparatus comprising:
    an elongated tubular and cylindrical housing open at each end, said housing defining a first and a second longitudinally spaced fluid ports,
    a first flapper valve associated with said first fluid port and a second flapper valve associated with said second fluid port, said flapper valves being movable between an open and a closed position and resiliently urged toward their respective closed positions,
    at least one reinforcing rib attached to and movable in unison with said first flapper valve, said reinforcing rib having a portion which extends through at least one receiving slot in said housing when said first flapper valve is in said open position so that, only when said first flapper valve is in said open position, a portion of said reinforcing rib extends through said housing,
    a pair of diametrically opposed latches pivotally mounted to said housing adjacent said second fluid port and pivotal about an axis perpendicular to an axis of said housing between a latch position and a release position,
    said latches engaging said second flapper valve when at least one of said latches is in said latch position and said second flapper valve in in said closed position to thereby prevent said second flapper valve moving to said open position,
    each latch having a cam surface which, when engaged, pivots said latch to said open position,
    wherein only a fuel nozzle of a predetermined size will engage both cam surfaces of both latches.

2. The apparatus as defined in claim 1 and comprising a pressure relief valve contained in at least one of said flapper valves.

3. The apparatus as defined in claim 1 and comprising a pressure relief valve contained in both of said flapper valves.

4. The apparatus as defined in claim 1 and comprising a spring which urges said first flapper valve towards a closed position.

5. The apparatus as defined in claim 1 and comprising a spring which urges said second flapper valve towards a closed position.

6. The apparatus as defined in claim 1 wherein said first flapper valve comprises a first valve part and a second valve part secured together by a snap fitting.

7. The apparatus as defined in claim 6 and comprising a pressure relief valve at least partially contained between said valve parts.

8. The apparatus as defined in claim 1 wherein said second flapper valve comprises a first valve part and a second valve part secured together by a snap fitting.

9. The apparatus as defined in claim 8 and comprising a pressure relief valve at least partially contained between said valve parts.

10. The apparatus as defined in claim 1 wherein said latches are elongated, pivotally secured to said housing adjacent one end and having a valve engaging hook at their other ends, said cam surface position between said ends of said latches.

11. A capless fuel apparatus comprising:
    an elongated tubular and cylindrical housing open at each end, said housing defining a first and a second longitudinally spaced fluid ports,
    a first flapper valve associated with said first fluid port and a second flapper valve associated with said second fluid port, said flapper valves being movable between an open and a closed position and resiliently urged toward their respective closed positions, at least one reinforcing rib attached to and movable in unison with said second flapper valve, said reinforcing rib having a portion which extends through at least one receiving slot in said housing when said second flapper valve is in said open position so that, only when said second flapper valve is in said open position, a portion of said reinforcing rib extends through said housing, a pair of diametrically opposed latches pivotally mounted to said housing adjacent said second fluid port and pivotal about an axis perpendicular to an axis of said housing between a latch position and a release position, said latches engaging said second flapper valve when at least one of said latches is in said latch position and said second flapper valve in in said closed position to thereby prevent said second flapper valve moving to said open position, each latch having a cam surface which, when engaged, pivots said latch to said open position, wherein only a fuel nozzle of a predetermined size will engage both cam surfaces of both latches.

12. The apparatus as defined in claim 11 and comprising a pressure relief valve contained in at least one of said flapper valves.

13. The apparatus as defined in claim 11 and comprising a pressure relief valve contained in both of said flapper valves.

14. The apparatus as defined in claim 11 and comprising a spring which urges said first flapper valve towards a closed position.

15. The apparatus as defined in claim 11 and comprising a spring which urges said second flapper valve towards a closed position.

16. The apparatus as defined in claim 11 wherein said first flapper valve comprises a first valve part and a second valve part secured together by a snap fitting.

17. The apparatus as defined in claim 16 and comprising a pressure relief valve at least partially contained between said valve parts.

18. The apparatus as defined in claim 11 wherein said second flapper valve comprises a first valve part and a second valve part secured together by a snap fitting.

19. The apparatus as defined in claim 18 and comprising a pressure relief valve at least partially contained between said valve parts.

20. The apparatus as defined in claim 11 wherein said latches are elongated, pivotally secured to said housing adjacent one end and having a valve engaging hook at their other ends, said cam surface position between said ends of said latches.

* * * * *